United States Patent
Heath

(10) Patent No.: US 7,538,528 B2
(45) Date of Patent: May 26, 2009

(54) CONSTANT POWER FOLDBACK MECHANISM PROGRAMMABLE TO APPROXIMATE SAFE OPERATING AREA OF PASS DEVICE FOR PROVIDING CONNECTION TO LOAD

(75) Inventor: Jeffrey Lynn Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 241 days.

(21) Appl. No.: 11/520,018

(22) Filed: Sep. 13, 2006

(65) Prior Publication Data

US 2008/0061752 A1    Mar. 13, 2008

(51) Int. Cl.
*G05F 1/569* (2006.01)

(52) U.S. Cl. .............. 323/274; 323/275; 323/277; 323/279

(58) Field of Classification Search ............ 323/273, 323/274, 275, 277, 279
See application file for complete search history.

(56) References Cited

U.S. PATENT DOCUMENTS

| | | | | |
|---|---|---|---|---|
| 3,723,774 A | * | 3/1973 | Rogers | 361/101 |
| 3,753,078 A | * | 8/1973 | Hedel | 323/277 |
| 3,771,021 A | * | 11/1973 | Bierly | 361/18 |
| 3,796,943 A | * | 3/1974 | Nelson et al. | 323/277 |
| 4,851,953 A | * | 7/1989 | O'Neill et al. | 361/101 |
| 5,559,423 A | * | 9/1996 | Harman | 323/277 |
| 5,666,044 A | * | 9/1997 | Tuozzolo | 323/277 |
| 5,804,955 A | * | 9/1998 | Tuozzolo et al. | 323/277 |
| 6,201,674 B1 | * | 3/2001 | Warita et al. | 361/18 |
| 7,012,791 B2 | * | 3/2006 | Kikuchi | 361/18 |
| 7,183,755 B2 | * | 2/2007 | Itoh et al. | 323/274 |
| 7,289,308 B2 | * | 10/2007 | Kimura | 361/93.1 |
| 2005/0044431 A1 | | 2/2005 | Lang et al. | |
| 2006/0049818 A1 | | 3/2006 | Montgomery | |
| 2006/0164774 A1 | | 7/2006 | Herbold et al. | |

OTHER PUBLICATIONS

International Search Report and Written Opinion of the International Searching Authority, issued in International Application No. PCT/US2007/019540, mailed May 6, 2008.

* cited by examiner

*Primary Examiner*—Jeffrey L Sterrett
(74) *Attorney, Agent, or Firm*—McDermott Will & Emery LLP

(57) ABSTRACT

System and methodology for supplying power to a load using a pass device for connecting the load. A current limit circuit prevents current supplied to the load from exceeding a current threshold. A foldback circuit modifies the current threshold in accordance with a prescribed condition. The foldback circuit is configured to vary the current threshold in accordance with an approximate safe operating area of the pass device.

20 Claims, 4 Drawing Sheets

CONSTANT POWER FOLDBACK MECHANISM PROGRAMMABLE TO APPROXIMATE SAFE OPERATING AREA OF PASS DEVICE FOR PROVIDING CONNECTION TO LOAD

TECHNICAL FIELD

This disclosure relates to power supply systems, and more particularly, to circuitry and methodology for providing a foldback current limit in a power supply system, such as a Power over Ethernet (PoE) system.

BACKGROUND ART

Traditionally, network devices such as IP phones, wireless LAN access points, personal computers and Web cameras have required two connections: one to a LAN and another to a power supply system. A PoE system eliminates the need for additional outlets and wiring to supply power to network devices. Instead, power is supplied over Ethernet cabling used for data transmission.

The PoE system must comply with the IEEE 802.3af standard that defines delivering power over unshielded twisted-pair Ethernet wiring from a PSE to a PD located at opposite sides of a link. As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting a PoE detection signature defined by the IEEE 802.3af standard.

If the detection signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

A pass device, such as a MOSFET, may act as a switch between the PSE and the PD. During power-up and short-circuit conditions, power dissipation in the MOSFET may be much higher than power dissipation when nominal power is provided. To limit the power dissipation, a foldback mechanism is prescribed by the IEEE 802.3af standard. In particular, the standard defines that in a startup mode, for port voltages between 10V and 30V, the minimum requirement for an output current ($I_{Inrush}$) is 60 mA. For port voltages above 30 V, the current $I_{Inrush}$ in a startup mode is required to be in the range from 400 mA to 450 mA. This 400 mA to 450 mA $I_{Inrush}$ requirement applies for duration of the 50 ms to 75 ms $T_{LIM}$ timer.

FIG. 1 shows a diagram that graphically illustrates the IEEE 802.3af foldback requirements. In particular, the gray areas in FIG. 1 show combinations of PSE output voltages and output currents that are not allowed by the IEEE 802.3af standard. The black line in FIG. 1 illustrates a possible foldback curve representing the output current of the PSE at a level between 400 mA and 450 mA for output voltages above 30V and gradually reduced for output voltages below 30V. The current limit foldback technique is used to limit dissipation power, and therefore, size and cost of the pass device.

However, for a high-power PSE capable of providing higher power to the PD than power mandated by the IEEE 802.3af specification, current limits should be higher than the 400 mA to 450 mA current prescribed by the IEEE 802.3af standard. Because higher currents cause higher MOSFET power dissipation, a larger pass device would be required. It would result in higher costs for the PSE manufacturer.

Therefore, there is a need for a foldback mechanism that would reduce power dissipation of a pass device in a high-power PSE.

SUMMARY OF THE DISCLOSURE

The present disclosure offers a novel system and methodology for performing foldback. In accordance with one aspect of the disclosure, a system for supplying power to a load has a pass device for providing a connection to the load, a current limit circuit for preventing current supplied to the load from exceeding a current threshold, and a foldback circuit for modifying the current threshold in accordance with a prescribed condition. The foldback circuit is configured to vary the current threshold in accordance with an approximate safe operating area of the pass device.

For example, to comply with the IEEE 802.3af specification, the foldback circuit may reduce the current threshold when a voltage across the load is below a pre-set value.

The foldback circuit may monitor a voltage across the load, and/or a voltage across the pass device to correspondingly vary the current threshold so as to maintain a substantially constant level of DC power dissipated by the pass device. The maintained level of DC power may correspond to a maximum amount of dissipated power safely handled by the pass device.

In accordance with an embodiment of the disclosure, the foldback circuit may maintain the current threshold at a first level, such as the level prescribed by the IEEE 802.3af specification, when a voltage across the load is between a first voltage value and a second voltage value.

The current threshold may be reduced below the first level when the voltage across the load is below the first voltage value. For example, the foldback circuit may monitor the voltage across the load to reduce the current threshold below the first level.

The current threshold may be increased above the first level when the voltage across the load is above the second voltage value. The foldback circuit may monitor a voltage across the pass device to increase the current threshold above the first level.

The foldback circuit may perform linear approximation of respective portions of the safe operating area when the current threshold is adjusted with respect to the first level.

A foldback control circuit may control the foldback circuit so as to select variable values of the current threshold. In particular, the foldback control circuit may program the foldback circuit to operate within a specific application in order to maximize the utilization of a SOA for a particular pass device.

In accordance with another aspect of the disclosure, a system for supplying power to a powered device (PD) over a communication link, such as a Power over Ethernet (PoE) system, comprises a power supply device having an output port for providing power to the PD over the communications link. Power is supplied to the PD via a semiconductor device. A current limit circuit prevents an output current of the power supply device from exceeding a current threshold, and a foldback circuit modifies the current threshold in accordance with a prescribed condition. The foldback circuit is configured to vary the current threshold so as to maintain a constant level of power dissipated by the semiconductor device.

The foldback circuit may monitor a voltage at the output port and/or a voltage across the semiconductor device to modify the current threshold so as maintain a constant level of DC power dissipated by the semiconductor device. In particular, the foldback circuit may approximate the safe operating area of the semiconductor device.

In accordance with a method of the present disclosure, the following steps are carried out to supply power to a load connected via a pass device:

limiting current supplied to the load to a current threshold value, and varying the current threshold value to maintain a constant level of power dissipated by the pass device.

The current threshold value may be varied to approximate the safe operating area of the pass device.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a PoE system. It will become apparent, however, that the concepts described herein are applicable to any system for supplying power to a load via a pass device.

Figure 1:
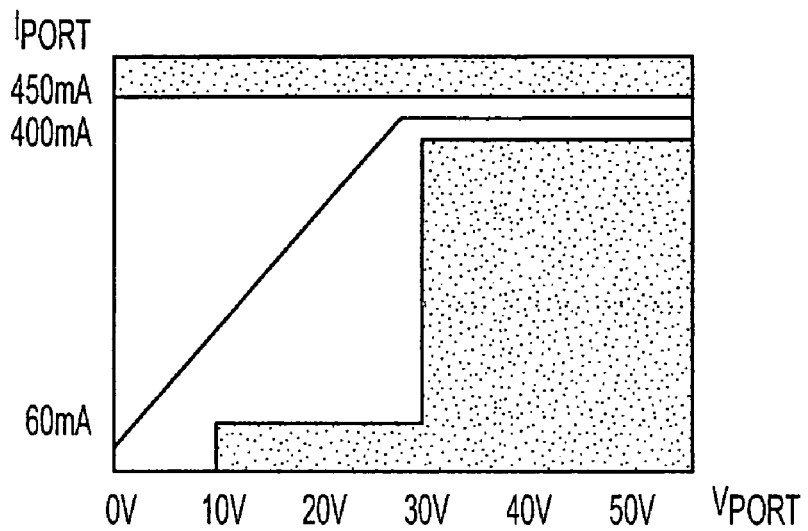
FIG. 1 is diagram illustrating the IEEE 802.3af foldback requirements.
Figure 2:
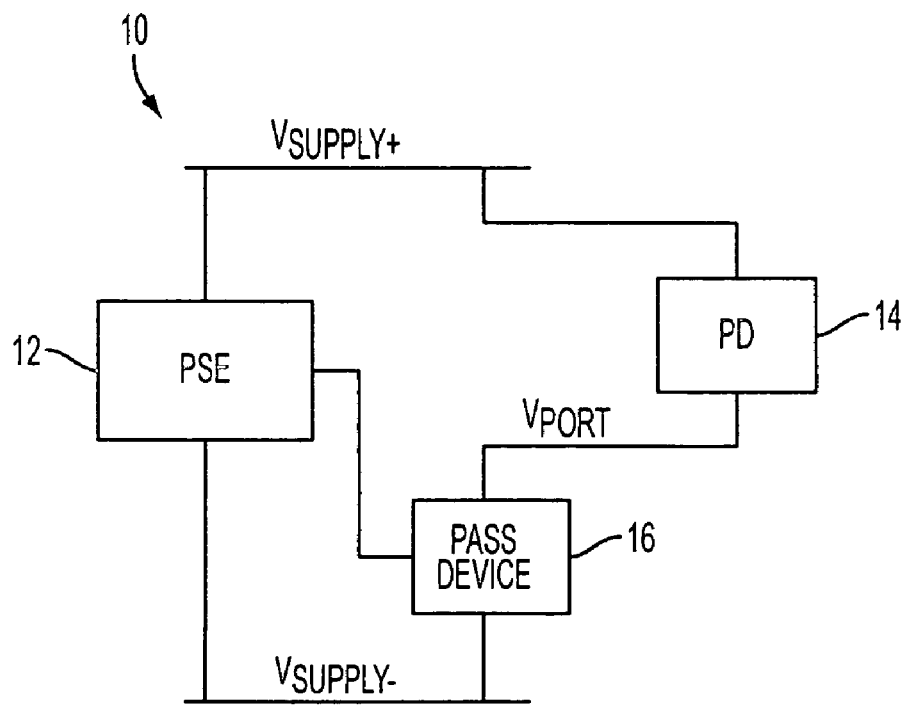
FIG. 2 is a diagram illustrating supplying power in PoE system.

FIG. 2 schematically illustrates voltages applied in a PoE system 10 between a PSE 12 and a PD 14. In particular, a PSE power supply may include positive terminal Vsupply$_+$ and negative terminal Vsupply$_-$. The PSE 12 may include a pass device 16, such as a power MOSFET, for connecting and disconnecting the PD 14 to and from the PSE 12. The gate of the power MOSFET 16 may be controlled to supply power from the PSE 12 to the PD 14. The voltage $V_{PD}$=Vsupply$_+$-Vport is applied across the PD 14, where Vport is a port voltage provided at the output port of the PSE 12. The power Ppass dissipated by the pass device is equal to Vpass×Iport, where Vpass=Vport−Vsupply$_-$ is the voltage applied across the pass device 16. When the voltage $V_{PD}$ across the PD 14 decreases, the voltage Vpass across the pass device 16 increases.

When the PD 14 is being connected to the PSE 12, i.e. in a start-up mode, and during short-circuit conditions, power dissipation in the pass device 16 may be much higher than power dissipation when nominal power is provided. To limit the power dissipation, a foldback mechanism is prescribed by the IEEE 802.3af standard. In particular, the standard defines that for port voltages Vport between 10V and 30V, the minimum requirement for an output current ($I_{Inrush}$) in the startup mode is 60 mA. For port voltages Vport above 30 V, the minimum $I_{Inrush}$ requirement is in the range from 400 mA to 450 mA. The minimum $I_{Inrush}$ requirement applies for duration $T_{LIM}$ set in the range between 50 ms and 75 ms.

Figure 3:
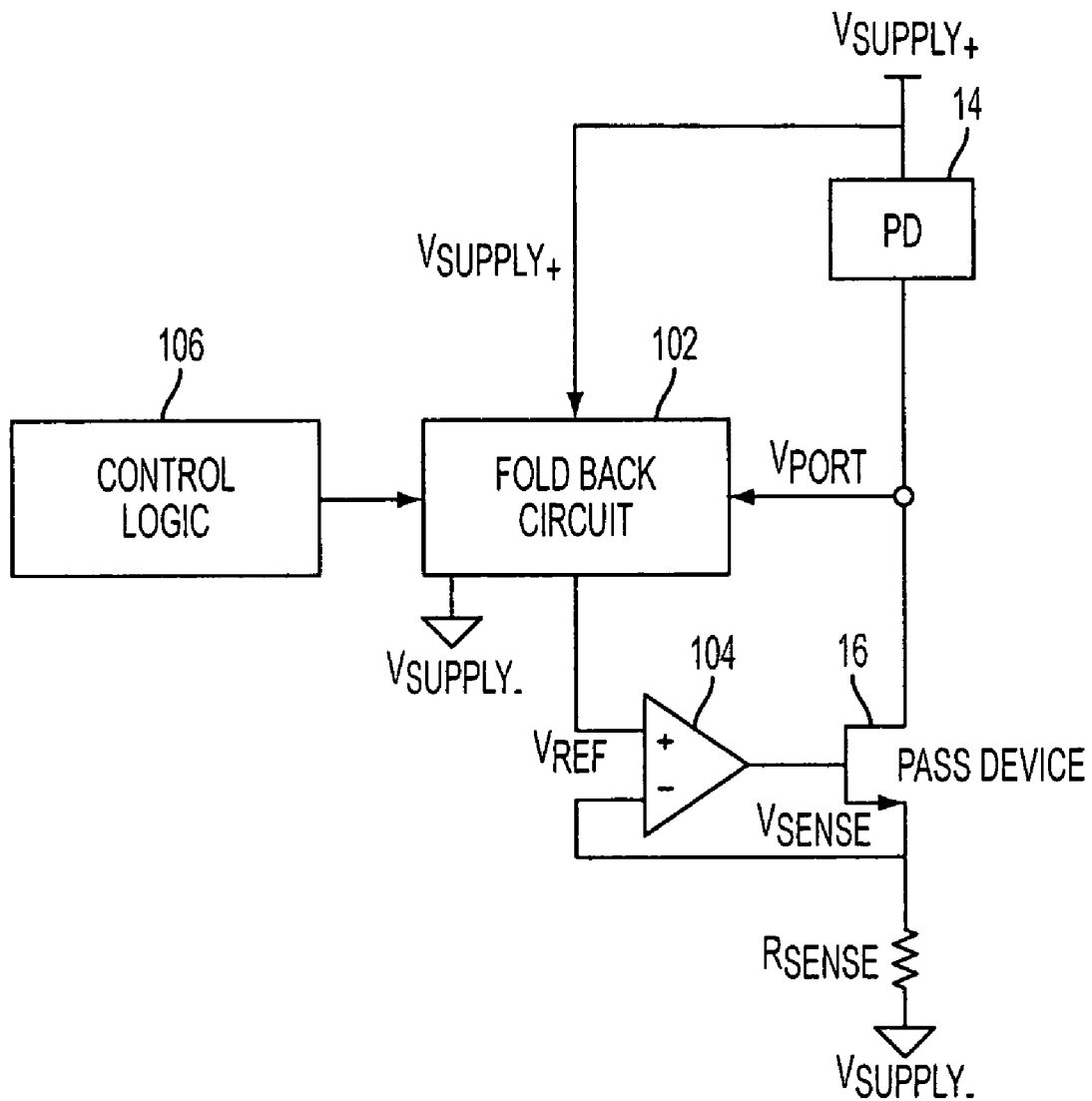
FIG. 3 is a diagram illustrating a foldback mechanism of the present disclosure.

As shown in FIG. 3, the foldback mechanism may comprise a foldback circuit 102 that controls a current limit circuit 104 so as to control the port current Iport of the PSE 12 in accordance with foldback requirements. In particular, the current limit circuit 104 monitors the port current Iport and compares it with a current limit threshold to maintain the port current Iport at or below the current limit threshold.

The port current Iport may be monitored by determining sense voltage Vsense across sense resistor Rsense connected to the pass device 16, such as a MOSFET. The current limit circuit 104 may comprise an operational amplifier that compares the determined sense voltage Vsense with a reference voltage Vref representing the current limit threshold to maintain the sense voltage at or below the Vref voltage. More specifically, the output of the operational amplifier may be connected to the gate of the MOSFET 16 to decrease gate drive voltage at the gate when the sense voltage Vsense increasing with an increase in the port current approaches the reference voltage Vref. As a result, the resistance of the MOSFET 16 increases, reducing the port current Iport.

The current limit circuit 104 is controlled by the foldback circuit 102 that may change the voltage Vref so as to achieve a required value of Iport. The foldback circuit 102 monitors the voltage $V_{PD}$=Vsupply$_+$-Vport applied across the PD 14, and/or the voltage Vpass=Vport−Vsupply$_-$ applied across the pass device 16. As described in more detail below, the foldback circuit 102 modifies the current limit threshold so as to limit power dissipated by the pass device 16 to a level corresponding to a safe operating area (SOA) of the pass device 16.

SOA of a pass device may be defined as the voltage and current conditions over which the pass device can be expected to operate without damage caused by the dissipation power, i.e. the SOA determines the amount of dissipation power the pass device can safely handle. The power Ppass dissipated by the pass device 16 is equal to Vpass×Iport. Decreasing the current limit threshold decreases the port current Iport flowing through the pass device 16. To limit the maximum power dissipation requirement in the pass device 16, the port current Iport should be decreased as the voltage Vpass across the pass device increases. This can lower the size and the cost of the pass device 16.

Figure 4:
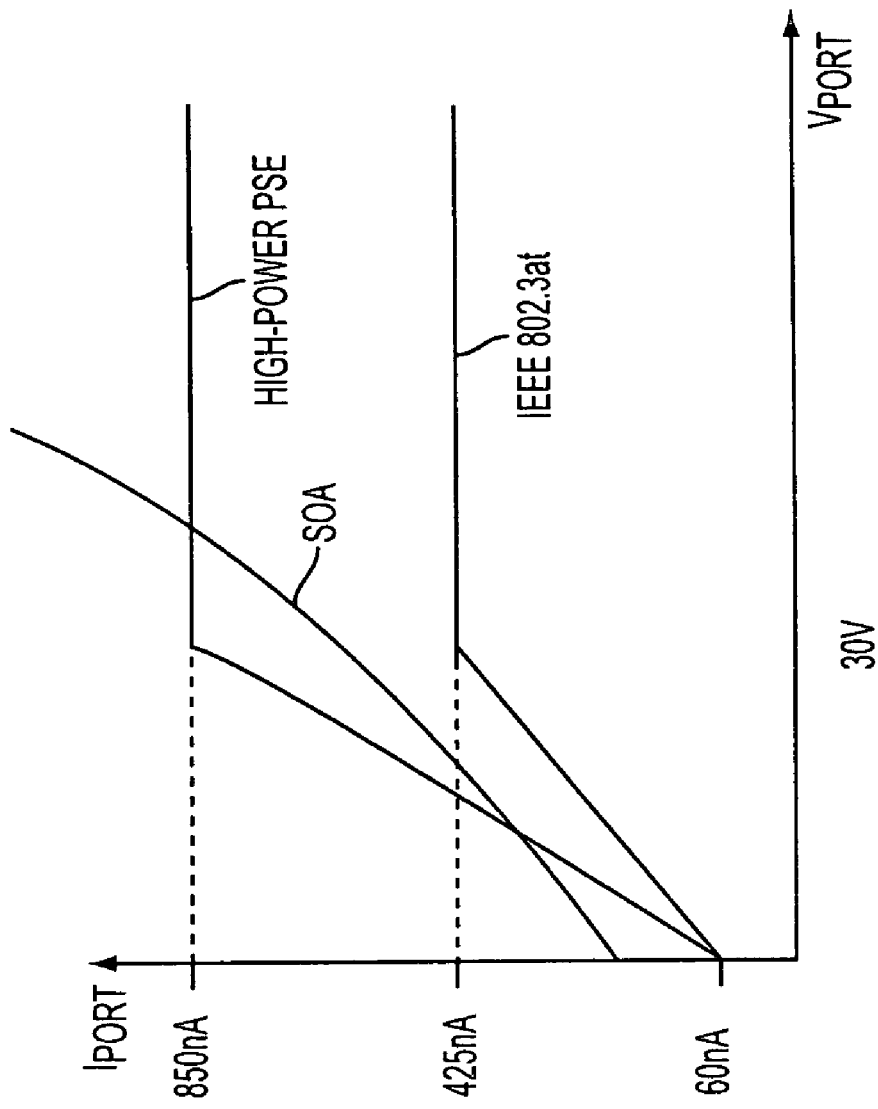
FIG. 4 is a diagram illustrating examples of safe operating area (SOA) of a pass device, and foldback curves for an IEEE 802.3 af-compliant PSE and a high-power PSE.

FIG. 4 illustrates an exemplary SOA of a pass device suitable for an IEEE 802.3af-compliant PSE. The SOA is represented by an area below the constant power curve defined by variable values of the port current Iport and the port voltage Vport. This power curve represents a maximum level of dissipation power Ppass that can be safely handled by the pass device 16. Also, FIG. 4 shows examples of foldback current limits for the IEEE 802.3af-compliant PSE, and for a high-power PSE that may provide higher amounts of power than the IEEE 802.3af standard requires.

In the illustrated example, the foldback current limit for the high-power PSE is doubled compared to the IEEE 802.3 af-compliant PSE, and allowed foldback voltage level remains the same. As a result, the pass device of the high-power PSE would be required to dissipate twice the power level of the IEEE 802.3 af-compliant pass device. This power dissipation would be outside the illustrated SOA. Therefore, a larger pass device would be required.

Figure 5:
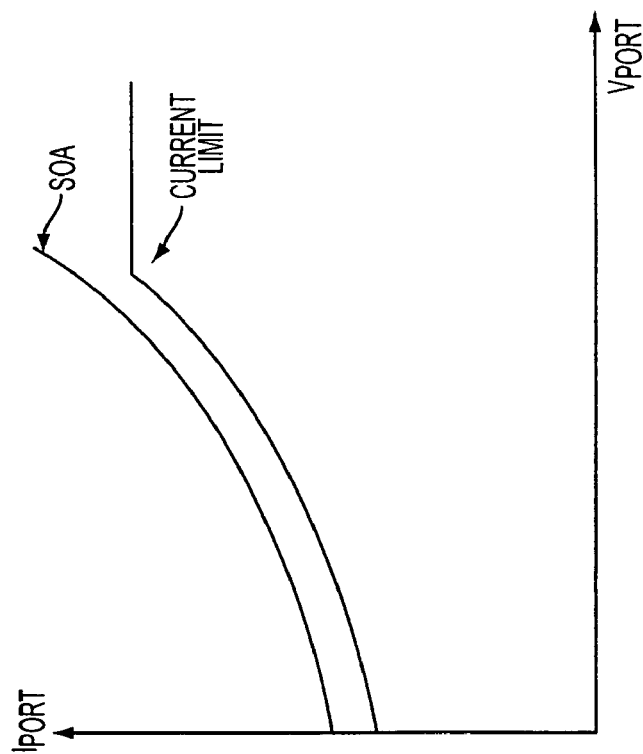
FIG. 5 is a diagram illustrating an exemplary foldback curve approximating the SOA.

To avoid using a larger pass device, the foldback circuit 102 of the present disclosure implements a foldback scheme that allows the PSE to deliver higher power without violating the SOA of a pass device suitable for the IEEE 802.3 af-compliant PSE. As illustrated in FIG. 5, the foldback circuit 102 may define the current limit threshold values so as to approximate the SOA of the pass device 16. In particular, the foldback circuit 102 may monitor the voltage $V_{PD}$ across the PD 14, and/or the voltage Vpass across the pass device 16 to define the current limit threshold so as to maintain a constant level of DC power dissipated by the pass device 16. The maintained DC power lower may be set at a level that can be safely handled by the pass device 16, i.e. at or below the constant power curve corresponding to the SOA of the pass device 16.

To implement this foldback scheme, the foldback circuit 102 may determine the reference voltage Vref as a function of the voltage $V_{PD}$ and/or the voltage Vpass to provide a constant level of DC power dissipation within the SOA of the pass device 16. The foldback circuit 102 may include logic circuits, such as multipliers, and other components for determining the reference voltage Vref. Alternatively, the foldback circuit 102 may be implemented using a general purpose digital signal processor and appropriate programming.

The foldback mechanism may further comprise a control logic circuit 106 for controlling the foldback circuit 102. In particular, the control logic circuit 106 may program the current limit curve produced by the foldback circuit 102 within a specific application to allow the system designer to maximize the utilization of a SOA for a particular pass device. The control logic circuit 106 may program the slopes, intermediate and final values of the current limit curve produced by the foldback circuit 102.

Figure 6:
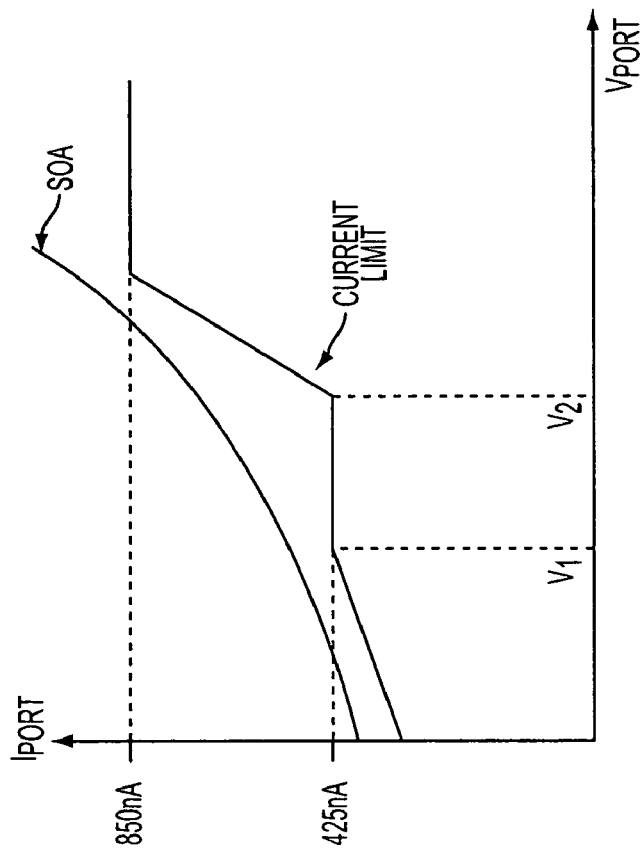
FIG. 6 is a diagram illustrating an exemplary foldback curve providing the linear approximation of the SOA.

FIG. 6 illustrates another foldback scheme using a foldback current limit that provides a linear approximation of the SOA. To implement this foldback scheme, the foldback circuit 102 may maintain the current limit threshold at a 425 mA level prescribed by the IEEE 802.3 af specification when the Vport voltage varies between values V1 and V2 programmable by the control logic circuit 106 to approximate a SOA of a particular pass device 16. When the Vport voltage is below V1, the current limit threshold may be linearly reduced so as to approximate the respective portion of the SOA. When the Vport voltage is above V2, the current limit threshold may be linearly increased to approximate the respective portion of the SOA. The current limit threshold may be increased until it reaches a level sufficient to enable the PSE 12 to deliver a required amount of power to the PD 14. For example, the upper portion of the current limit threshold may be set at a 850 mA level corresponding to the example illustrated in FIG. 4.

To implement the foldback scheme illustrated in FIG. 6, the foldback circuit 102 may monitor the voltage $V_{PD}$ across the PD 14, and/or the voltage Vpass across the pass device 16 to determine values of the reference voltage Vref defining the current limit threshold. For example, the $V_{PD}$ voltage may be monitored to define a lower portion of the threshold curve, and the Vpass voltage may be monitored to define an upper portion of the threshold curve. The V1 and V2 values and the slopes of the current threshold lines may be programmed by the control logic circuit 106 to maximize utilization of the SOA.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for supplying power to a load, comprising:
a pass device for providing a connection to the load,
a current limit circuit for preventing current supplied to the load from exceeding a current threshold, and
a foldback circuit for modifying the current threshold in accordance with a prescribed condition,
the foldback circuit being configured to vary the current threshold in accordance with an approximate safe operating area of the pass device, and for reducing the current threshold when a voltage across the load is below a pre-set value.

2. A system for supplying power to a load, comprising:
a pass device for providing a connection to the load,
a current limit circuit for preventing current supplied to the load from exceeding a current threshold, and
a foldback circuit for modifying the current threshold in accordance with a prescribed condition,
the foldback circuit being configured to vary the current threshold in accordance with an approximate safe operating area of the pass device, and for monitoring a voltage across the load to correspondingly vary the current threshold so as to maintain a substantially constant level of DC power dissipated by the pass device.

3. The system of claim 2, wherein the maintained level of DC power corresponds to a maximum amount of dissipated power safely handled by the pass device.

4. A system for supplying power to a load, comprising:
a pass device for providing a connection to the load,
a current limit circuit for preventing current supplied to the load from exceeding a current threshold, and
a foldback circuit for modifying the current threshold in accordance with a prescribed condition,
the foldback circuit being configured to vary the current threshold so as to approximate a safe operating area of the pass device.

5. The system of claim 4, wherein the foldback circuit is configured for monitoring a voltage across the pass device to correspondingly vary the current threshold so as to maintain a substantially constant level of DC power dissipated by the pass device.

6. The system of claim 5, wherein the maintained level of DC power corresponds to a maximum amount of dissipated power safely handled by the pass device.

7. The system of claim 4, further comprising a foldback control circuit for controlling the foldback circuit so as to select variable values of the current threshold.

8. A system for supplying power to a load, comprising:
a pass device for providing a connection to the load,
a current limit circuit for preventing current supplied to the load from exceeding a current threshold, and
a foldback circuit for modifying the current threshold in accordance with a prescribed condition,
the foldback circuit being configured to vary the current threshold in accordance with an approximate safe operating area of the pass device, and for maintaining the current threshold at a first level when a voltage across the load is between a first voltage value and a second voltage value.

9. The system of claim 8, wherein the foldback circuit is configured for reducing the current threshold below the first level when the voltage across the load is below the first voltage value.

10. The system of claim 9, wherein the foldback circuit is configured for increasing the current threshold above the first level when the voltage across the load is above the second voltage value.

11. The system of claim 10, wherein the foldback circuit is configured for monitoring a voltage across the pass device to increase the current threshold above the first level.

12. The system of claim 11, wherein the foldback circuit is configured in accordance with an approximate safe operating area of the pass device when the current threshold varies with respect to the first level.

13. The system of claim 8, wherein the foldback circuit is configured for monitoring the voltage across the load to reduce the current threshold below the first level.

14. A system for supplying power to a powered device (PD) over a communication link, comprising:
a power supply device having an output port for providing power to the PD over the communications link, the power supply device being configured to supply power via a semiconductor device,
a current limit circuit for preventing an output current of the power supply device from exceeding a current threshold, and
a foldback circuit for modifying the current threshold in accordance with a prescribed condition,
the foldback circuit being configured to vary the current threshold so as to approximate a safe operating area of the semiconductor device.

15. The system of claim 14, wherein the power supply device is configured for supplying power to the PD over an Ethernet link.

16. The system of claim 15, wherein the foldhack circuit is configured for monitoring a voltage at the output port to modify the current threshold.

17. The system of claim 15, wherein the foldback circuit is configured for monitoring a voltage across the semiconductor device to modify the current threshold.

18. The system of claim 15, wherein the foldback circuit is configured for maintaining a constant level of DC power dissipated by the semiconductor device to approximate the safe operating area of the semiconductor device.

19. A method of supplying power to a load connected via a pass device, comprising the steps of:
limiting current supplied to the load to a current threshold value, and
varying the current threshold value so as to approximate a safe operating area of the pass device.

20. The method of claim 19, wherein the current threshold value is varied to maintain a constant level of DC power dissipated by the pass device so as to approximate the safe operating area of the pass device.

* * * * *